United States Patent Office 3,074,738
Patented Jan. 22, 1963

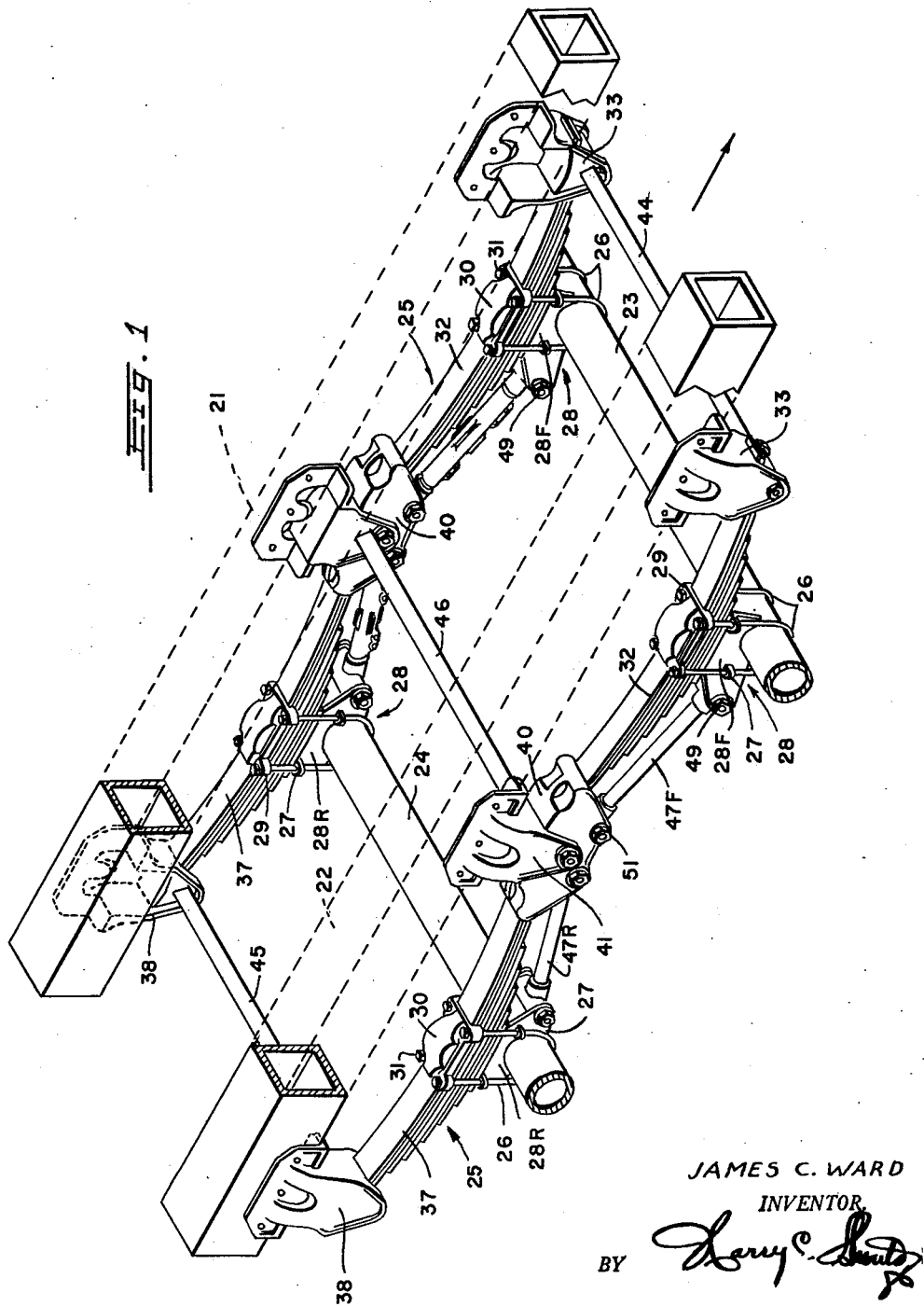

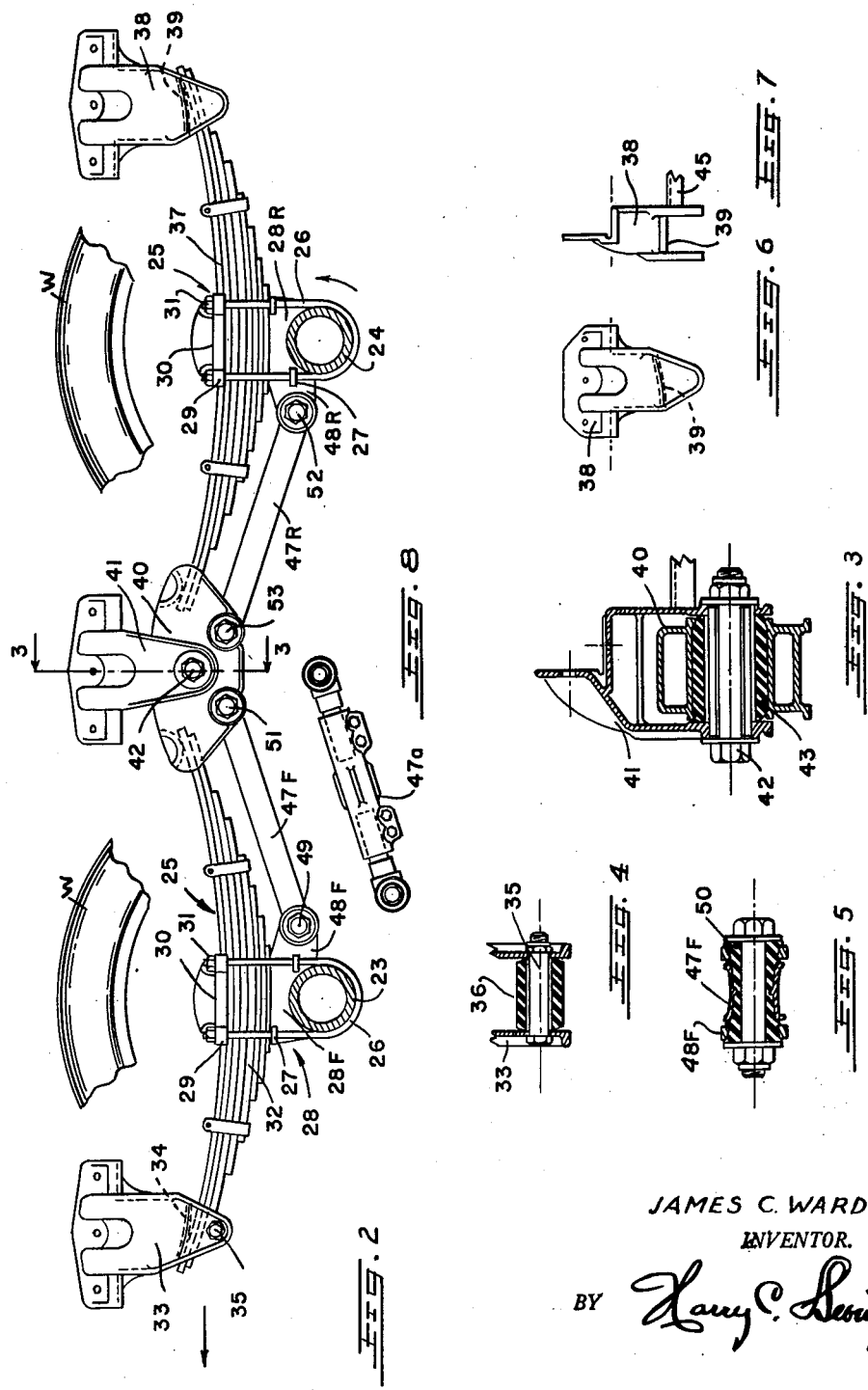

3,074,738
AXLE SUSPENSION UNIT
James C. Ward, Springfield, Mo., assignor to Webb Metal Products Co., Tulsa, Okla., a corporation of Oklahoma
Filed July 8, 1960, Ser. No. 41,570
8 Claims. (Cl. 280—104.5)

This invention relates to vehicle suspensions; to such suspensions employing sprung axles and torque arms to increase braking efficiency and eliminate brake hop; and more particularly to a heavy duty axle suspension unit wherein the forces of brake torque are balanced or cancelled by improved equalizing linkage. The elimination of brake hop is conducive to utmost safety.

Ordinarily, when a heavy duty vehicle with conventional springs is running unloaded or only slightly loaded, it is subject to severe vibrations, well known in the industry as "brake hop," during sudden or emergency braking operations. These vibrations are characterized by vertical oscillation of the rear axle or axles and the wheels carried thereby towards and from the road, and the resultant wheel impacts produce forces of such magnitude that equipment life is appreciably reduced, safety of operation impaired, and shifts in the load take place to the detriment of the cargo and equipment.

Accordingly, a primary object of the present invention is to provide an improved suspension for heavy duty vehicles, which suspension overcomes brake hop and other shortcomings of prior art vehicle suspension systems.

The invention is particularly adaptable to heavy duty trailers having tandem running gear wherein two spaced independently sprung axles are employed and wherein equalizing connections are employed to equalize the load on the axles. The most commonly used constructions further involve the springs being rigidly secured with the axle seats by a suitable clamp or fastener device. In such tandems the phenomena of brake hop, while experienced to some degree in both axles, primarily involves the front most axle, and the equalizer connections become ineffective during braking so that vehicle weight is supported chiefly by the rear axle. For example, when the brakes are applied forces are introduced into the suspension which tend to rotate the axles about respective control points. These forces are transferred through the springs which are fixedly attached to the axles as a force couple creating a downward force at the forward ends of the springs and an upward force at the rear ends of the springs. Reacting forces on the springs come into play, and the result is that the wheels on the axles, and especially those on the front axle, rise from the road and subsequently return thereto. The cycle of axle and wheel rise and fall repeats during brake application with increasing frequency, shaking the vehicle, leading to early breakdown of the same and even endangering the vehicle driver who is subjected to great strain by the impacts as well as the stress of maintaining the vehicle under control.

The present invention thus involves a suspension unit which comprises in its most comprehensive form equalizing linkage uniquely interposed between the axle and spring and the vehicle chassis. This linkage includes an equalizer beam rockably connected with the chassis and employed against a spring end, and a torque arm pivotally connected at one end with the axle seat and at its other end with the equalizer beam in such a manner as to cancel the torsional forces aforesaid created upon brake application. With vehicles having tandem running gear, the rockable equalizer beam is positioned between the axles and the respective axle torque arms are engageable therewith so as to overcome the torsional forces.

Another object of this invention is to provide a suspension unit wherein the springs are rigidly mounted with the axles and are relieved of braking torque so that they may perform their intended function of supporting vehicle load properly.

A further object of the invention is to employ the equalizer linkage in such a manner as to be able to maintain tandem axles in substantial alignment. In carrying out this object the invention contemplates the provision wherein the torque arms extending from the axle seats are connected to a common reference, namely the equalizer beam, to maintain thereby a common relation between the axles which thus may be maintained substantially parallel at all times.

The invention further has among its objects the provision of equalizing linkage equally adaptable to both single and tandem axle suspensions, which linkage when employed with tandem axles may be utilized at one or both of the axles and still be effective to eliminate brake hop.

The foregoing objects are made possible in accordance with the present invention by the provision beneath the vehicle chassis of a vehicle axle associated with the chassis by means of conventional springs at each axle end. Each spring intermediate its ends is rigidly fixed to the axle by a simple seat arrangement, and at one end is received in conventional manner by a depending hanger bracket while its other end is pivotally mounted to a rockable equalizer beam maintained on a second hanger bracket. A torque arm, at each axle end, is pivotally mounted at one arm end with the seat arrangement, and at its other end is pivotally connected with the equalizer beam. The torque arm connection with the equalizer beam is so arranged with respect to the engagement of the spring and the equalizer beam that, during brake application, forces transmitted from the spring and from the torque arm to the beam cancel each other out to nullify any possibility of brake hop.

As further exemplified herein the invention is adapted to tandem running gear and includes substantially similar spring and seat arrangement at both axles, with the equalizer beam rockably positioned between the axles, and the torque arms extending to, and pivotally connected with, the equalizer beam so as to cancel torsional forces during braking, as explained more fully hereinafter.

The foregoing and other objects, features and advantages of construction will become more apparent upon a consideration of the following description together with the accompanying drawings.

In the drawings:

FIGURE 1 is a perspective view of a tandem axle unit embodying the present invention, the forward direction of tandem travel being indicated by the arrow shown therein;

FIGURE 2 is a side elevation of the same, again with an arrow shown therein to indicate forward travel;

FIGURE 3 is a partial cross-sectional view taken on line 3—3 in FIGURE 2;

FIGURE 4 is a partial cross-sectional view through a front spring retention bracket;

FIGURE 5 is a partial cross-sectional view of a torque arm end pivoted to the seat arrangement;

FIGURE 6 is a side elevation view of a typical rear spring retention bracket;

FIGURE 7 is a rear elevation view of the same; and

FIGURE 8 is an elevation view of another form of torque arm.

Referring to the drawings, the vehicle chassis includes side frame members or sills 21, 22, extending longitudinal of the vehicle, and, as exemplified herein, a front axle 23 and a rear axle 24 for supporting the vehicle wheels W. The tandem spring mechanism 25 is mounted at each end of each axle 23, 24, each spring mechanism 25 being mounted to its respective axle by pairs of U-bolts 26 passing through lugs 27 integral with an axle seat 28 and lugs 29 integral with an upper U-bolt plate 30, the aforesaid structure further providing an axle seat assembly fixed with the spring mechanism. Nuts 31 secure the assembly in place.

On each side of the vehicle running gear, each front most spring 32 at its forward end is supported in a front hanger bracket 33 depending from respective sill 21 or 22. Specifically, the spring is received between a bracket shoulder 34 and a stop in the form of a capscrew 35 extending through the bracket lower end. A resilient rubber spring retainer 36 surrounds the capscrew 35. Further, on each side of the vehicle running gear, each rear spring 37 back end is engageable in a rear hanger bracket 38 secured to and depending from the vehicle chassis, the spring end being particularly engageable on a rear bracket shoulder 39 to sustain the vehicle load.

Connection of the rear end of each front spring 32 and the front end of each rear spring 37 to the chassis is accomplished by a respective equalizer beam 40 interposed between adjacent ends of the springs 32, 37, and rockably mounted upon an equalizer bracket 41 fixed to and depending from the vehicle chassis. A capscrew 42 extends through the bracket 41 to provide a center of rotation for the beam 40, and is surrounded by a rubber bushing 43 to thereby provide a resilient bearing for the beam 40.

Thus, each spring mechanism 25 is secured to its respective axle 23 or 24 by a conventional U-bolt and axle seat arrangement; each front spring 32 at the forward end thereof is received in conventional manner by a front spring hanger bracket 33; each rear spring 37 at the rear end thereof is received in a rear spring hanger bracket 38 in conventional manner; and the rear end of each front spring 32 and the front end of each rear spring 37 are engageable with a rockable equalizer beam 40 in conventional manner. Further, each of the springs 32, 37, provides a three point suspension, which along with the equalizer beam 40 affords uniform distribution of load on the axles 23, 24.

Each front spring hanger bracket 33 differs from the corresponding rear spring hanger brackets 38, besides in the shape of the shoulders 34, 39, in that the front spring brackets 33 carry capscrew 35 and the resilient cushion 36 thereon. The two front spring brackets 33 may be connected by a brace rod 44; the two rear spring hanger brackets 38 may be connected by a brace rod 45; and the two equalizer hanger brackets may be connected by a brace rod 46.

With the structure thus far described the vehicle load is distributed on the axles 23, 24, substantially equally during normal conditions. However, upon application of the vehicle brakes there is a tendency of the rear axle 24 to rotate in the direction of the arrow shown in FIGURE 2, forcing the forward end of the rear spring 37 downwardly in the direction of such rotation, thereby lowering the rear end of the equalizer beam 40, and correspondingly raising the forward end of the beam 40. This equalizer beam movement frees the rear end of the front spring 32, thereby releasing the front axle 23 from the load of the vehicle. This occurrence, coupled with the fact that brake application also tends to cause the front axle to rotate in the same direction as the rear axle 24, and tends to raise the rear end of the front spring 32, as the wheels W on the front axle lift from the road, so reduces traction of the front axle wheels W that the latter experience the hereinbefore described brake hop. In order to eliminate this undesirable brake hop, the herein invention provides novelly connected torque arms as hereinafter described.

As seen in FIGURES 1 and 2, a torque arm 47F or 47R is provided between each axle seat 28 and the equalizer beam 40 adjacent thereto. Specifically, each front axle seat 28F is provided with a rearwardly extending yoke arm 48F to which the front end of torque arm 47F is pivotally connected at a point 49. A resilient rubber bushing 50 is interposed between the torque arm 47F and its pivotal connections. At its other end the torque arm 47F is pivotally connected with the equalizer beam 40 at a point 51. Similarly, each rear axle seat 28R is provided with forwardly extending yoke arm 48R to which at a point 52 a respective torque arm 47R is pivotally connected at one of its ends and at the other of its ends to the equalizer beam 40 at a point 53. Similar bushing material 50 is provided at the pivots of torque arm 47R with the axle seat 28R and equalizer beam 40.

As seen in FIGURE 1, at each of the axles 23, 24, the torque arms 47F and 47R may be of the adjustable type as that illustrated in FIGURE 8 to facilitate axle alignment. In the modified adjustable torque arm 47a there is provided structure which gives a turnbuckle effect to move the axles as desired. It should be understood, however, that the herein invention applies equally as well to one-piece and adjustable torque arms, and that the arm connections are the same in either case.

It should be noted that the connections of the torque arms 47F and 47R to their respective axle seats 28F and 28R at the points 49, 52, provide convenient control points about which the axles 23, 24, tend to rotate during brake application. Also, the torque arms 47F and 47R, although pivoted at their ends, provide connections capable of torque transmission. Thus, while the engagements of the springs 32, 37, with the equalizer beams 40 occur at points, as exemplified herein, above the center of equalizer beam rotation, the connections of the torque arms 47F and 47R to the beam 40 at the points 51, 53, are below said center of rotation of the beam 40, thus providing means for applying equalizing forces to cancel the forces transmitted to the beam 40 by the engagement of springs 32, 37, therewith during braking.

During braking the following action takes place: The braking torque tends to rotate the rear axle 24 about the point 52, and an upward force is transmitted by the axle to the rear end of spring 37, which upward force is cancelled by a downward force proportionate to the weight of the suspended vehicle since the rear end of spring 37 is engageable with a non-depressable portion of the bracket 38; therefore, it is unnecessary to provide stabilizing means or a stabilizing force at the forward end of the rear spring 37. However, the rear torque arm 47R does supplement the forward torque arm 47F in providing a stabilizing force to cancel the torque in the equalizer beam. This latter torque is in a clockwise direction as a result of the upward force at the rear end of the front spring 32. As the forward end of spring 37 tends to move downwardly, tending to cause the equalizer beam 40 to rotate clockwise, as viewed in FIGURE 2, the rear torque arm 47R provides means for resisting this torque. Opposite torques thus are provided to the beam 40 by the front end of spring 37 and arm 47R. At the front spring 32, the downward force at the spring forward end is resisted and absorbed by the resilient spring retainer 36 on the stop capscrew 35. The upward movement of the rear end of spring 32, during brake application, tends through its engagement with beam 40 to rotate the latter in a clockwise direction also, as viewed in FIGURE 2, and this upward force on the beam 40 is resisted and cancelled by a force introduced thereto by the arm 47F.

As further illustrated herein, the equalizer beams are disposed midway between the axles 23, 24, and the adjacent ends of the springs 32, 37; and the pivot points 51, 53, of the torque arms 47F, 47R, to the beams 40 are equal distant and opposite from the centers of beam rotation. These designed distances aid in maintaining the axles 23, 24, by means of the torque arms 47F and 47R, in substantially parallel relationship.

It should be further pointed out that both torque arms, for a suspension as herein disclosed, may not be necessary. For example, merely by increasing the force arm application of the torque arm 47F on the beam 40, such as exemplified herein by lowering the pivotal connection point 53, it is possible to overcome and cancel all the brake torque introduced in the tandem suspension, thereby eliminating the need for arm 47R. This is so since, during braking, both of the arms 47F, 47R, apply torque to the beam 40 in the same direction, or, looking at it another way, both of the arms 47F, 47R, resist the same directional brake torque effect on their respective axles 23, 24. With this in mind, it follows that the effectiveness of either of the arms 47F, 47R, may be varied as desired merely by increasing or decreasing their respective force arm application upon the equalizer beam 40.

In accordance with the present invention, brake hop thus is eliminated by connecting the torque arms between the axle seats and the equalizer beams rather than between the axle seats and a fixed chassis bracket. A common pivotal connection exists between each axle seat and one end of a respective torque arm, and at its other end the said torque arm, together with a respective axle spring, is so arranged as to apply opposite torques to the equalizer beam. Any detrimental brake hop thus may be immediately obviated. Use of the equalizer beams as a common reference and connection for torque arms on each side of the running gear also provides a common reference for keeping the axles in alignment.

Further, the springs are free to perform primarily their intended function of carrying vehicle load, leaving axle alignment and brake torque cancellation to the equalizer beam and the torque arms. The equalizer beams thus not only perform the function of maintaining uniform loads on both axles during normal operations, but also through their connections with the torque arms act as a common reference through which torques are applied to resist the forces of brake torque.

It will be understood that changes in construction and arrangement in parts may be resorted to without departing from the field and spirit of the invention; that this application discloses but one form of the invention; and that the scope of the invention is defined in the appended claims.

What is claimed is:

1. A suspension for a vehicle having a chassis and paired tandem axles in underlying relation thereto, comprising on each side of the chassis: an equalizing beam pivotally associated with the chassis intermediate the paired axles; paired springs, each interposed between the chassis and a respective axle, adjacent ends being engageable with said equalizer beam in spaced relation to the pivot thereof; and a torque arm pivotally connected at one end with one of said axles, at its other end pivotally connected with said beam in spaced relation to the pivot thereof, and arranged to sustain a force opposed to the brake forces induced on the beam during vehicle braking, whereby brake hop is substantially eliminated.

2. The suspension described in claim 1 and additionally including a second torque arm pivotally connected at one end with the other of said axles, and at its other end pivotally connected with said beam below the pivotal mount thereof.

3. A suspension for a vehicle having a chassis and an axle in underlying relation thereto, comprising: an axle seat; a beam pivotally associated with the chassis; a spring interposed between the chassis and the axle, fixedly secured with the axle seat, and engageable at one end with said beam in spaced relation to the pivot thereof; a torque arm at one end pivotally connected with said axle seat, at its other end pivotally connected with said beam in spaced relation to the pivot thereof, and so arranged as to sustain a load force opposed to spring force induced on the beam during vehicle braking.

4. In a suspension for a vehicle having a chassis, an axle in underlying relation thereto, a spring suspending the axle from the chassis, and a beam pivotally associated with the chassis and engaged remote from the beam pivot by an end of said spring, the improvement comprising: a torque arm pivotally connected at its ends to both the axle and the beam, the pivotal connection of said torque arm with said beam being independent of the latter's pivotal association with said chassis to effectively sustain a load force opposed to the spring force induced on the beam during braking, whereby brake hop is substantially eliminated.

5. A suspension for a vehicle having a chassis and paired tandem axles in underlying relation thereto, comprising at each side of the chassis: an equalizer beam pivotally associated medially its ends and intermediate said axles with said chassis; paired springs, each interposed between said chassis and a respective axle, adjacent spring ends being engageable with said beam at opposed sides thereof and remote from the pivot of said beam; and a torque arm pivotally linking the beam with one of the axles, and effective to resist axle brake rotation induced otherwise during vehicle stopping.

6. A vehicle suspension assembly comprising with paired tandem axles the combination, at each vehicle chassis side, of: a pair of springs, each interposed between the chassis and a respective axle; an equalizer beam pivotally mounted with said chassis intermediate its end and between the axles, and having means for slidably engaging adjacent ends of said springs at opposed beam sides remote from the pivot of said beam; and a pair of torque arms, each pivotally connecting a respective axle with said equalizer beam, the connections between said torque arms and said equalizer beam being in opposed spaced relation and below the pivot of said beam to provide thereby effective resistance to axle rotation during vehicle braking.

7. A suspension for a vehicle having a chassis and paired tandem axles in underlying relation thereto, comprising at each side of the chassis: a pair of axle seats, one for each axle and including means for fixed attachment thereto; a pair of springs in end to end relation, each interposed between the chassis and a respective axle seat and rigidly fixed medially its ends to its respective axle seat; means including resilient means for slidably receiving the forward end of the front most spring; means for slidably receiving the rearward end of the rear spring; an equalizer beam including a central portion pivotally associated with the chassis and opposed ends having housings for receiving slidably therein remote from and above the pivot of said beam the other ends of said springs; and a pair of torque arms, each including resilient means at the ends thereof, pivotally connecting a respective axle seat with said beam below said beam pivot, and effective to resist rotation of said axles during vehicle braking.

8. A vehicle suspension assembly for operative association with a chassis, comprising paired tandem axles, a pair of bowed springs on each side of said chassis, said springs being rigidly fixed to axles at their bowed midpoint to present spaced chassis supporting ends, equalizing means pivotally depending from said chassis on each side thereof between each pair of bowed springs, a pair of torque arms on each side of said chassis and extending between said equalizing means and each axle, each torque arm having extremity connectors for pivotal attachment to said equalizing means and their respective axle, the pivotal connection of said torque arms with said equalizing means on each side of said chassis being independent of and equidistantly spaced from said equalizing means suspension pivot, said torque arms being effective to resist axle rotation during vehicle braking, whereby brake hop is substantially eliminated.

References Cited in the file of this patent

UNITED STATES PATENTS

| | | |
|---|---|---|
| 1,745,088 | Fry | Jan. 28, 1930 |
| 2,653,035 | Ward | Sept. 22, 1953 |
| 2,734,755 | Van Raden | Feb. 14, 1956 |